United States Patent [11] 3,573,650

[72] Inventor Ugo Maltese
Genova, Italy
[21] Appl. No. 814,136
[22] Filed Apr. 7, 1969
[45] Patented Apr. 6, 1971
[73] Assignee The Marconi Company Limited
London, England
[32] Priority Apr. 11, 1968
[33] Italy
[31] 51261-A

[54] AUTOMATIC FREQUENCY CONTROLLED OSCILLATORS
8 Claims, 5 Drawing Figs.

[52] U.S. Cl. 331/27, 331/1, 331/8, 331/25
[51] Int. Cl. H03b 3/04
[50] Field of Search 331/1, 8, 27, 25

*Primary Examiner*—John Kominski
*Attorney*—Bladwin, Wight, Diller and Brown

ABSTRACT: Automatic frequency control means for oscillator arrangement of modulatable frequency wherein signals from the oscillator, and signals from a reference source are compared in a comparator which produces signals dependent on the frequency difference of the oscillator and the reference at one or other of two outputs, in dependence upon the sense of said difference. The signals from the comparator drive a circuit which produces a frequency controlling signal which is fed to the oscillator.

Patented April 6, 1971 3,573,650

2 Sheets-Sheet 1

INVENTOR
Ugo Maltese
BY
Baldwin Wight Diller & Brown
ATTORNEYS

INVENTOR
Ugo Maltese
BY
Baldwin Wight Diller & Brown
ATTORNEYS

AUTOMATIC FREQUENCY CONTROLLED OSCILLATORS

This invention relates to frequency modulatable oscillators and has for its main object to provide improved means for effecting automatic frequency control of such oscillators. The invention is particularly well adapted for use in sound and television transmitters and F.M. radio transmitters, but is not limited to these applications.

A known and commonly used way of stabilizing the frequency of a frequency modulatable oscillator is by means of a frequency discriminator, sometimes employed in conjunction with a reference crystal. However, known systems of this nature are undeniably costly and complex and possess the inherent disadvantage of a high degree of sensitivity to instabilities due to thermal and structural changes occurring with time in the various components of the circuit. Because of this, such known systems are not satisfactory for use in cases where a very high degree of frequency stability is required, e.g. for the stabilization, against variation with time of the modulated carrier employed in modern data transmission systems. The frequency of this modulated carrier must be highly stable in time, in order to avoid distortion of the transmitted data, with consequent faulty reception at the sound/television signal or other discriminators to which the data is fed.

The present invention seeks to provide improved and simple automatic frequency control means which will enable a high degree of frequency stability of the frequency modulatable oscillator to be attained—high enough to satisfy the onerous requirements, in this respect, of modern data transmission systems; which shall not adversely affect the linearity or waveform of the oscillator controlled, for example by introducing appreciable if any noise; and which can be readily designed to have a long integration time for stabilizing the frequency of the oscillator controlled—long enough to be satisfactorily employed for oscillators modulated by frequencies as low as 30 c.p.s. as is the case with sound/television transmission.

According to this invention an oscillator of modulatable frequency has automatic frequency control means comprising a comparator which is arranged to compare a frequency derived from and dependent on the oscillator frequency with a frequency derived from and dependent on the frequency of a reference frequency source, said comparator being adapted to provide at one or other of two outputs thereof a signal consisting of a number of pulses per unit of time proportional to the difference between the two inputs thereto, said pulses appearing at one or other of said outputs in dependence upon the sense of said difference and being employed to drive an integrating circuit to produce a frequency controlling signal which is applied to the oscillator and is of polarity and magnitude respectively dependent on the sense and magnitude of the aforesaid difference.

The invention is illustrated in the accompanying drawing, in which.

Figure 1:
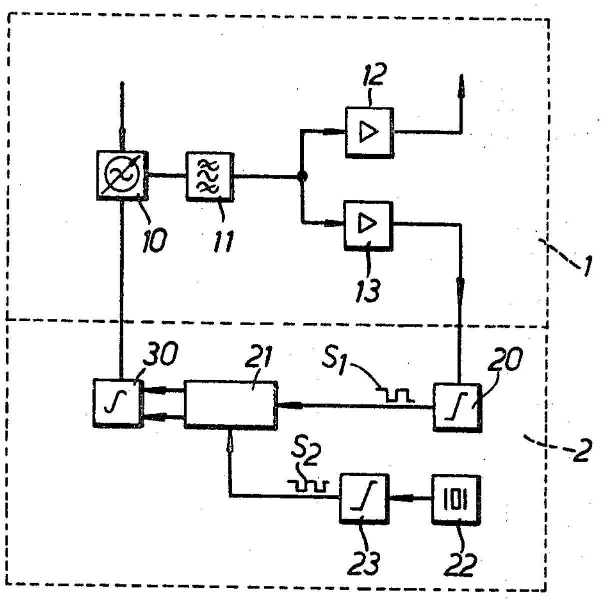
FIG. 1 is a block diagram of one embodiment of the invention.

Referring to FIG. 1 this is shown, for convenience, as divided into two sections within broken line rectangles, section 1 including the circuit of the frequency modulatable oscillator and section 2 showing the circuit of the automatic frequency control means provided by this invention.

The oscillator to be controlled is indicated at 10 and its output is fed via a harmonics suppressor 11 to two amplifiers 12 and 13. Amplifier 12 provides output for utilization and the said output is fed to a transmitter, for example, (not shown). Amplifier 13 provides output for operation of the apparatus in the control section 2.

In section 2 the output from amplifier 13 is fed via an amplitude squaring and limiting circuit 20 as one input to a frequency comparator represented in FIG. 1 by the block 21. The second input to this comparator is a reference signal from a crystal controlled reference oscillator 22 after squaring and limiting in amplitude by a squaring and limiting circuit 23.

The frequency of the output $S_2$ from the reference oscillator 22 should be at least three times that of the output $S_1$ from the oscillator 10.

Figure 2:
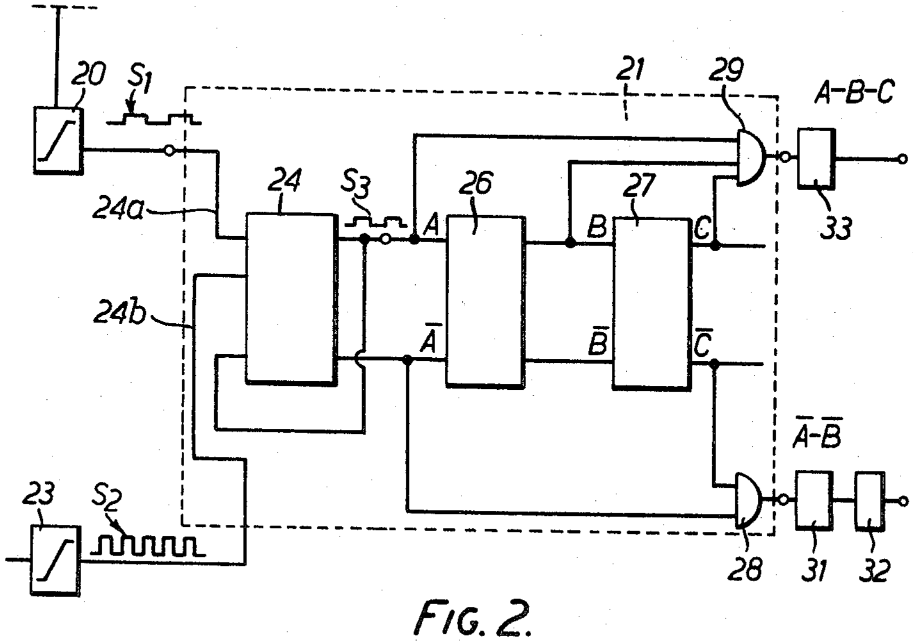
FIG. 2 is a diagram of the comparator 21 of FIG. 1.

Referring to FIG. 2 the comparator includes a first bistable 24, to which is fed the signal $S_1$ over the input lead 24*a* and the signal $S_2$ over the input lead 24*b*. The output from the bistable stage 24 is indicated by $S_3$.

Bistable 24 synchronizes the wavefronts of signals $S_1$ with the wavefronts of the reference signal $S_2$. This is shown by line *a* of FIG. 4. Assume the frequency of $S_2$ is three times that of $S_1$. Then in the absence of any frequency deviation of oscillator 10 from its nominal value, the period $T$ will equal three periods of the reference signal $S_2$. This is the situation pictured in line *a*.

Suppose, however, $S_1$ shifts in frequency. Then, although signal $S_3$ will always have its leading edges corresponding in time with the fronts of reference signal $S_2$ there will be irregularities of period as shown by $T_1$ (line *b*) and $T_2$ (line *c*) which differ from period $T$. Lines *b* and *c* are drawn for the cases in which the frequency shift is respectively above and below the nominal frequency.

The frequency ratio between $S_2$ and $S_1$ can be more than 3/1 (in which case smaller differences between $T_1$ and $T_2$ will result) but the said ratio must always be greater than 2.

Figure 5:
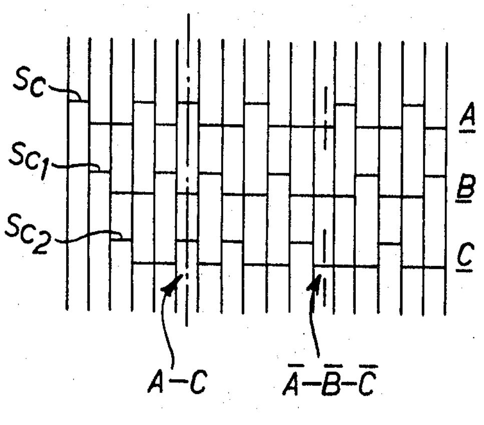

Referring again to FIG. 2 the output from bistable 24 is fed to a bistable 26 followed by a bistable 27 which together act as a double shift register in cooperation with two logic gates 28 and 29 respectively. The gate 28 provides an output which is the logic AC product of the synchronized signal $Sc$ and $Sc_2$, at nodes corresponding, respectively with the input to shift register 26 and the output from the shift register 27. The gate 29 provides an output which is the logic product $\overline{A}.\overline{B}.\overline{C}.$ of synchronized signals $Sc$, $Sc_1$, $Sc_2$, at nodes corresponding to the inputs and the outputs of both the shift registers, 26 and 27. The signals $Sc$, $Sc_1$ and $Sc_2$ are indicated in FIG. 5 while A, B and C and $\overline{A}$, $\overline{B}$ and $\overline{C}$ appear as indicated in FIG. 2.

Figure 4:
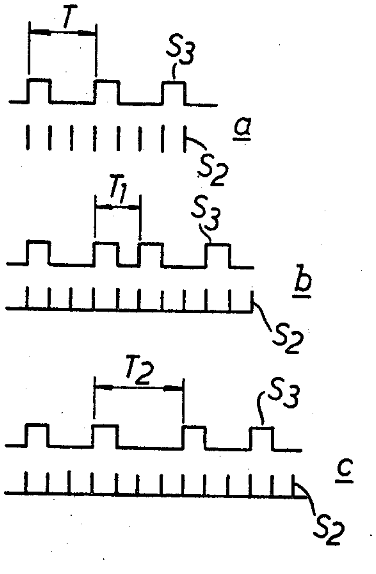
FIGS. 4 and 5 show waveforms occurring at different parts of the comparator 21.

The double shift register 26/27 and logic gates 28/29 make evident errors of the type indicated in lines *b* and *c* of FIG. 4. At the output terminals of the gates there will appear pulses at a beat frequency $fb$ given by the expression $$fb=fr-nf_{oi},$$

where $fr$ is the reference frequency, $f_{oi}$ is the instantaneous frequency of the modulated oscillator, $n$ is the ratio $fr/f_o$, and $f_o$ is the nominal frequency of the modulated oscillator. In the particular example chosen.

$$fr=3f_o \text{ and } n=3.$$

Thus pulses at the frequency $fb$ will be present at the output of the logic gate 28 if $f_{oi}$ is higher than $fr$ and pulses at this frequency $fb$ will be present at the output from gate 29 if $f_{oi}$ is lower than $fr$.

The outputs from the logic gates 28 and 29 are used to drive an integrator circuit 30 (FIG. 1) the output from which is a control signal fed to the modulatable frequency oscillator 10.

Figure 3:
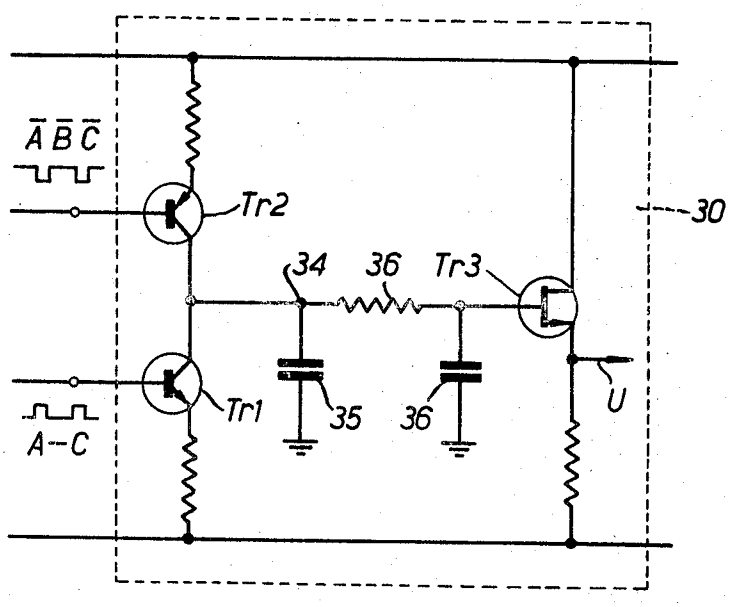
FIG. 3 is a diagram of the integrator circuit 30 of FIG. 1.

Integrator circuit 30 may be as illustrated in FIG. 3 and comprises two transistors $Tr_1$ and $Tr_2$, to whose bases are applied, through suitable circuits, the outputs from the logic gates 28 and 29. As shown (see FIG. 2) the output from gate 28 is applied via a monostable 31 followed by an inverter 32 and the output from the gate 29 is applied via a monostable 33.

The function of the monostables 31 and 33 is to increase the duration of the pulses produced in the output circuits of the gates 28,29 to pulses of such duration as to result in a duty cycle of 50 percent in the event of maximum shift of the modulatable oscillator frequency away from the nominal frequency.

The integrator 30 provides a control voltage of one polarity in response to signals from one gate 28 and a control voltage of the other polarity in response to output signals from gate 29. As will be clear from FIG. 3, transistors $Tr_1$ and $Tr_2$ act as current generators driven by the pulses. An integrating network 34—35—36 leads to an output transistor $Tr_3$, the output $U$ from which the control signal for the oscillator 10. The said output $U$ will be positive or negative in polarity, depending on whether the current applied to capacitor 35 derives from transistors $Tr_1$ or from transistor $Tr_2$, i.e. whether a logic product signal is present at the output of gate 28 or of gate 29.

Small variations in the duration of the pulses at the outputs from the monostables will not adversely affect the accuracy of the frequency control.

The invention can be used with advantage whether the waveform of the modulated wave is symmetrical or asymmetrical. In the latter case the positive and negative peaks will be different, but the mean value of the frequency will still be centered on the reference frequency.

I claim:

1. An oscillator arrangement of modulatable frequency having automatic frequency control means comprising a comparator which is arranged to compare a frequency derived from and dependent on the oscillator frequency with a frequency derived from and dependent on the frequency of a reference frequency source, said comparator being adapted to provide at one or other of two outputs thereof a signal consisting of a number of pulses per unit of time proportional to the difference between the two inputs thereto, said pulses appearing at one or other of said outputs in dependence upon the sense of said difference and being employed to drive an integrating circuit to produce a frequency controlling signal which is applied to the oscillator and is of polarity and magnitude respectively dependent on the sense and magnitude of the aforesaid difference.

2. An arrangement as claimed in claim 1 wherein the reference frequency input to the comparator is three times the other input thereto said other input being an input of the nominal frequency of the oscillator.

3. An arrangement as claimed in claim 2 wherein the comparator inputs derived from the oscillator and from the reference source are derived by means of squaring and amplitude limiting circuits in the input signal paths to the two input terminals of the comparator.

4. An arrangement as claimed in claim 3 wherein the reference frequency is derived from a crystal controlled oscillator.

5. An arrangement as claimed in claim 4 wherein the two input signals fed to the comparator are fed thereto through a bistable connected and arranged to synchronize the wavefronts of said two input signals.

6. An arrangement as claimed in claim 5 wherein said bistable feeds into a double shift register which is constituted by two further bistables and which cooperates with two logic gates one of which provides the logic product of the synchronized signal at the input of the first stage of the shift register and at the output of the second stage of the register and the other of which provides the logic product of the synchronized signals at the inputs and at the outputs of both stages of the shift registers.

7. An arrangement as claimed in claim 6 wherein the integrator circuit includes two transistor fed respectively with outputs from the logic gates one being fed through a monostable and an inverter and the other being fed through a monostable, the two monostables being designed to produce an increase in the duration of the output pulses from the gates.

8. An arrangement as claimed in claim 7 wherein the two transistors are connected to draw currents of opposite polarity from a capacitor cooperating with an integrator network to drive a third transistor which provides the controlling signal for the oscillator to be controlled in frequency.